No. 683,044. Patented Sept. 24, 1901.
R. E. HOLDER.
BED PAN.
(Application filed Oct. 24, 1900.)
(No Model.)
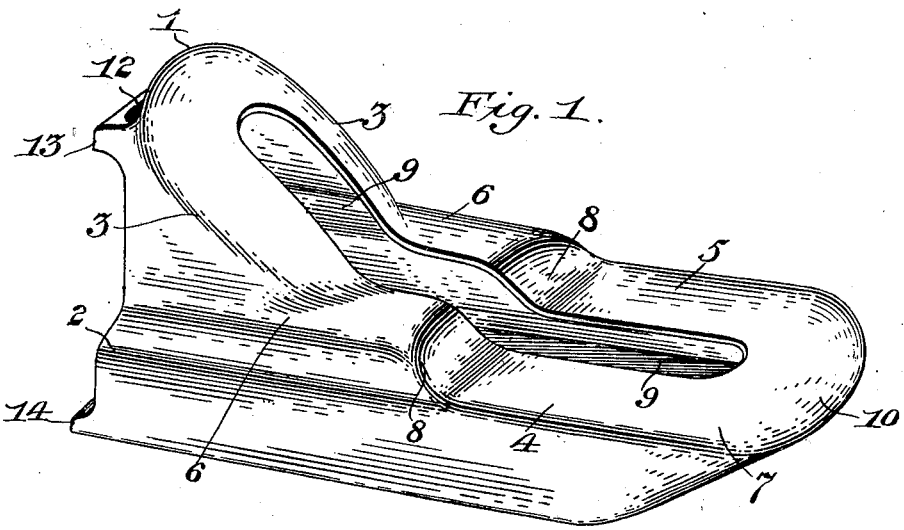
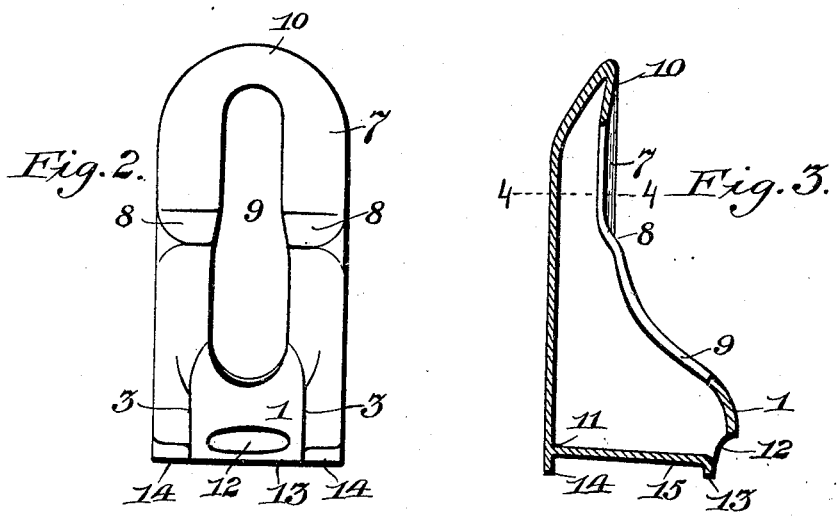
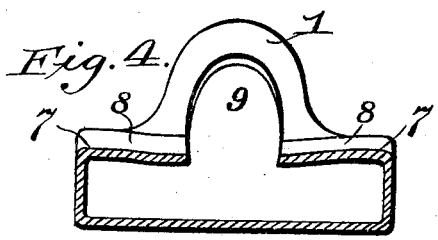
Witnesses
R. H. Priest.
C. Severance.
Inventor
Richard E. Holder,
By Ernest K. Hood,
Attorney
THE NORRIS PETERS CO., PHOTO-LITHO., WASHINGTON, D. C.

UNITED STATES PATENT OFFICE.

RICHARD E. HOLDER, OF COLUMBUS, INDIANA.

BED-PAN.

SPECIFICATION forming part of Letters Patent No. 683,044, dated September 24, 1901.

Application filed October 24, 1900. Serial No. 34,203. (No model.)

*To all whom it may concern:*

Be it known that I, RICHARD E. HOLDER, a citizen of the United States of America, residing at Columbus, in the county of Bartholomew and State of Indiana, have invented certain new and useful Improvements in Bed-Pans, of which the following is a specification.

My invention is more especially adapted to be used in connection with adjustable beds, such as are shown in Letters Patent issued to myself and J. W. Adney April 3, 1900, and bearing number 646,831.

The objects of my invention are to provide a sanitary bed-pan provided with a proper upper contour to fit the body of a patient in any position it may be desired to use the pan, to provide a bed-pan which can be easily douched and cleaned and which is self-draining, and to provide a pan which can be easily handled and stored away; and my invention consists in the combination and arrangement of parts hereinafter described and claimed.

In the drawings, Figure 1 is a perspective view of my improved bed-pan; Fig. 2, a top or front elevation of the pan in draining position; Fig. 3, a central vertical section of the same; and Fig. 4, a cross-section on line 4 4, Fig. 3.

The upper side of my improved pan is provided with a raised horn portion 1, which meets the main part 2 in a gradual curve 3, said curve being located and centered from an imaginary point located near 4 5, supposed to be the hip-joint. These curves are struck from these points, and all surfaces formed thereby will be parallel with the limbs of a patient, allowing them to rest easily and in a natural position at all points. The main portion 2 adjacent the horn is provided with a slightly-rounded level part 6, which supports the limbs when in a horizontal position. Back of this level part 6 is a smooth surface 7, depressed below surface 6 to form raised ledge 8, which holds the patient from slipping forward. These raised places are gradually rounded off to meet all adjacent surfaces. Surface 7 is gradually depressed toward the center, so that any liquids falling thereon will drain into slot 9, which extends from a point near the rear well up into the horn 2. The rear end is slightly depressed at 10, so as to prevent injury to the coccyx or sacrum from striking the pan. The under side of the pan below the part 10 is inclined, so as to fit an adjustable bed closely.

The entire interior of the pan is hollowed out and drained toward point 11. The front end of horn 2 is cut away to form an opening 12. Located adjacent this opening and extending from side to side is a flange 13, which, in conjunction with flange 14 at the lower edge, form a stable and suitable support for the pan when in draining position. Surface 15 is pitched toward opening 12, and when pan is resting on these flanges it can be easily douched and perfectly cleaned and drained. When the pan is not in use, it can be easily stored away.

The pan can be used in a reclining, semi-erect, or erect position and is perfectly comfortable at all times.

I claim as my invention—

1. A bed-pan formed with a supporting-surface on its upper side, a horn formed thereon, the pan having an elongated receiving-slot in its upper surface and a discharge-opening in one end, said end being of such configuration that the pan may rest upon it in stable equilibrium when turned up to drain, the draining-opening being substantially in the same horizontal plane with the lowest part of said end when in such position, substantially as described.

2. A bed-pan provided with a raised horn portion; an opening in the end of said horn portion, a flange extending across said opening, a second flange, extending across the end of the bed-pan and adapted to coöperate with the first flange and form a stable base for the pan when placed in draining position, substantially as shown and described.

3. A bed-pan having an upper portion formed with a main supporting-surface shelving inwardly toward an elongated opening, higher auxiliary supporting-surfaces connected with the lower main support by a comparatively abrupt inclined surface a horn portion rising between the auxiliary supports, the said slotted elongated opening extending into the horn, the said horn being provided with a draining-opening, substantially as described.

RICHARD E. HOLDER.

Witnesses:
LYNAS C. SEAL,
E. K. HOOD.